No. 732,073. PATENTED JUNE 30, 1903.
C. N. HATFIELD.
SEED CLEANER AND SEPARATOR.
APPLICATION FILED JUNE 23, 1902.
NO MODEL.

Witnesses:
S. C. Duvall.
R. E. Randle.

Inventor:
CHARLES N. HATFIELD,
by his attorney
Robert N. Randle.

No. 732,073.

Patented June 30, 1903.

UNITED STATES PATENT OFFICE.

CHARLES N. HATFIELD, OF NEAR FOUNTAIN CITY, INDIANA.

SEED CLEANER AND SEPARATOR.

SPECIFICATION forming part of Letters Patent No. 732,073, dated June 30, 1903.

Application filed June 23, 1902. Serial No. 112,797. (No model.)

*To all whom it may concern:*

Be it known that I, CHARLES N. HATFIELD, a citizen of the United States, residing near Fountain City, in the county of Wayne and State of Indiana, have made certain new and useful Improvements in Seed Cleaners and Separators, of which the following is a specification; and I do hereby declare the following to be a full, clear, and exact description of the invention, such as will enable others skilled in the art to which it appertains to make and use the same.

This invention relates to improvements to be used in connection with seed cleaners and separators; and the object of the invention is to provide certain improvements whereby the operation of cleaning and separating certain kinds of seeds may be greatly simplified and the labor connected therewith reduced to a minimum, in addition to more thoroughly cleaning and separating the seeds.

Another object is to provide a machine for cleaning and separating seeds, of new and novel construction, capable of a wide scope of usefulness and efficiency.

Other objects and advantages will appear from the following specification and from the drawings forming a part thereof.

With the above-enumerated objects in view my invention consists in a machine for cleaning and separating grains and seeds embodying certain novel and peculiar features, configurations, and details of construction, as herein shown and described, and particularly pointed out in the claim terminating this specification.

In detail the invention relates to a seed cleaning and separating machine, substantially as shown in the accompanying drawings, in which—

Figure 1:
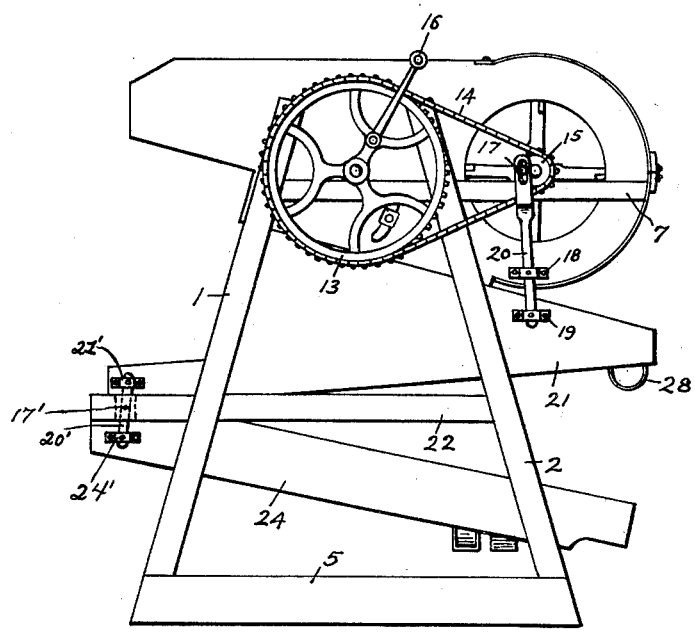
Figure 2:
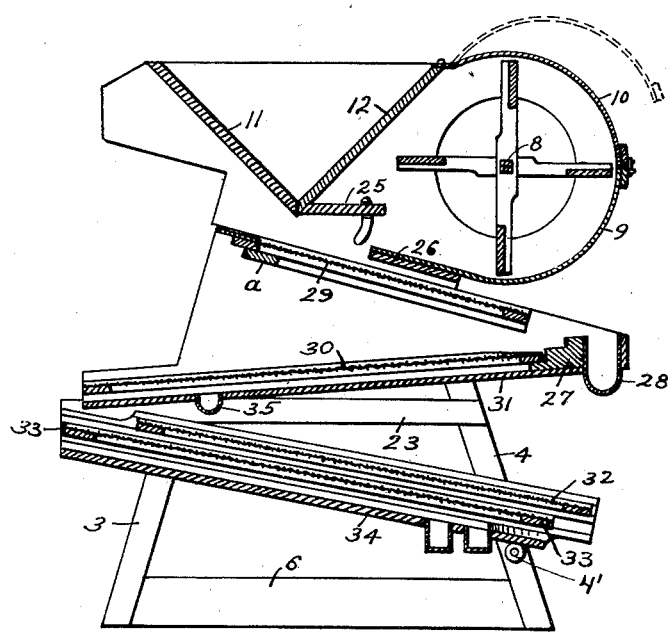

Figure 1 shows the elevation of the operating side of my machine, and Fig. 2 is a central longitudinal section of same.

Similar letters and figures of reference denote and refer to like parts in both the views.

In the drawings, 1, 2, 3, and 4 represent the upwardly-extending posts of the frame which supports the various mechanisms, said posts being arranged in pairs at each side of the machine, with their lower ends flaring to the front and rear, as shown, and with cross members 5 and 6 connecting the respective pairs of posts at their lower ends.

Extending horizontally between the posts 1 and 2, near their upper ends, and then forward a considerable distance is the bar 7, and a corresponding bar extends from the posts 3 and 4. On the bar 7 is mounted the fan-shaft 8, to which latter are secured radial fan-arms, and on the ends of said fan-arms are secured the respective fans. The outward portion of the fan-wheel is inclosed by a two-part casing, the lower portion 9 being secured to the frame of the machine and the upper portion 10 being hinged at its upper rear edge to the front of the hopper. The hopper is located on a level with and immediately in the rear of the fan, and it consists of the two converging members 11 and 12, which form a V-shaped hopper. The member 11 is adapted to be moved edgewise away from the member 12 in order to vary the opening in the vortex. The member 12 forms a blast-deflecting board for carrying the blast generated by the fan to the desired working point.

Mounted on the forward bar 7 is the sprocket-wheel 13, over which passes the sprocket-chain 14. The sprocket-chain 14 also passes over a smaller sprocket-wheel 15, which is secured to the end of the shaft 8, and the wheel 13 is supplied with a crank-handle 16. Extending out from near the periphery of the face of the wheel 15 is a pivot 17.

Secured to the end of the fan-casing 9 is a U-shaped hanger 18, and below this, secured to the vibrating shoe 21, is a second U-shaped hanger 19. Pivotally mounted in the hangers 18 and 19 and extending upward to the sprocket-wheel 15 is the arm 20. The upper end of the arm 20 is provided with a longitudinal slot therethrough in which operates the pivot 17.

Extending from the posts 1 and 2 and from the posts 3 and 4 are horizontal bars 22 and 23, which extend to the rear some distance and carry the rear ends of the shoes 21 and 24 in the manner shown. The shoes 21 and 24 have secured thereto a pair of brackets 21' and 24' on each side thereof, in which are pivoted the ends of rock-shaft 20', which in turn is centrally pivoted to the cross-bars 22 and 23 at 17. Upon the post 4 is mounted a roller 4', supporting the rear end of shoe 24. With this arrangement motion is communicated from the wheel 13 to the fan-wheel and to the arm 20, which in turn actuates the shoes 21 and 24 through the rock-arm 20', moving thereby the shoes in opposite directions to one another at each movement of the arm 20.

Extending forward from the lower edge of the member 12 is an adjustable blast-deflecting board 25, which extends between the sides of the machine and is hinged to the lower edge of the member 12, and the forward end is adapted to be raised and lowered to regulate the blast through the throat formed between the members 25 and 26. Lying obliquely forward and below the board 25 is the permanent blast-deflecting board 26, thus forming a throat between the forward end of the board 25 and the rear end of the board 26.

Extending across the forward end of the shoe 21 is a block 27, with offset rearwardly-extending faces providing seats for the forward ends of the screens, and extending across the forward end of the shoe 21 is the incline conveying-spout 28.

29 represents a forwardly-inclined screen, its rear end resting on the cross-strip $a$ and its forward end being adapted to rest in the upper offset of the block 27 when pushed inward.

30 represents a rearwardly-inclined screen slidably mounted between the sides of the machine, its forward end resting on one of the offsets in the block 27.

Extending across the under side of the shoe 21 is a bottom 31, near the rear end of which I provide an incline conveying-channel 35.

The shoe 24 carries a plurality of screens, as 32 and 33, and is provided with a bottom 34, provided with appropriate discharge-spouts. The screens 32 and 33 should be of same length, and they are adapted to be slid forward and backward independent of each other in order that either or neither of them may receive the discharge from the rear end of the screen 30. All the grain and seeds falling on the screen 29 will pass through the meshes thereof, the chaff being carried to the rear by the fan-wheel, while the trash will be carried forward and deposited in the conveyer-trough 28. The screen 30 is adapted to be placed forward or rearward of its position shown in the drawings in order to adapt it to the work to be performed.

It will now be apparent that the machine being arranged as shown and described, by turning the wheel 13 the fan will be revolved and the seed passed through the vortex of the hopper, that the chaff will be blown out rearward by the fan, and the seeds and grain will fall on the vibrating screen 29, and that the trash will be carried forward and deposited in the trough 28, and the seeds will fall onto the screen 30, after which by the adjustments of the various screens the seeds will be separated and deposited at various points. By the arrangement shown of the screen 30 with reference to the block 27 it is apparent that the deposit from the rear end of the screen 30 may be made away from the machine or onto one of the screens carried by the shoe 24.

From the above description, taken in connection with the accompanying drawings, it will be apparent that I have produced a seed cleaning and separating machine embodying new and novel features and details of construction and have accomplished the objects stated, and I wish it to be understood that I do not restrict myself to the exact details of construction, but hold that any slight changes in such details as would suggest themselves to the ordinary mechanic will clearly fall within the scope of my invention.

Having now fully shown and described my invention and the best mode for its construction and use to me known at this time, what I claim as new, and desire to secure by Letters Patent of the United States, is—

The combination with the frame, the hopper, and the fan-casing arranged to one side of said hopper, of a permanent deflecting-board secured to said frame adjacent the inner end of said fan-casing, a second board hinged to the lower end of said hopper and being adapted to engage the first-named board, an inclined screen arranged beneath said hopper and extending above said first-named board, a screen arranged beneath said first-named screen and being inclined in the reverse direction, both of said screens being mounted in a common shoe, a shoe having screens slidably mounted therein arranged beneath the first-named shoe, a shaft carrying a fan mounted in said casing, means for operating said shaft, and means for operating said shoes.

In testimony whereof I have hereunto signed my name in the presence of two subscribing witnesses.

CHARLES N. HATFIELD.

Witnesses:
R. W. RANDLE,
R. E. RANDLE.